(12) United States Patent
Rasmusen et al.

(10) Patent No.: US 7,999,017 B2
(45) Date of Patent: *Aug. 16, 2011

(54) METHOD FOR COLORING BUILDING MATERIALS USING A CATIONIC PIGMENT DISPERSION

(75) Inventors: Hans Rasmusen, Hvalso (DK); Jorn R. Thorsson, Virum (DK); James E. Moore, Cincinnati, OH (US); Charles W. Perry, Boiling Springs, SC (US); Joseph LaBazzo, Sr., Mason, OH (US)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/778,366

(22) Filed: May 12, 2010

(65) Prior Publication Data

US 2010/0222453 A1     Sep. 2, 2010

Related U.S. Application Data

(63) Continuation of application No. 10/478,385, filed as application No. PCT/US02/15856 on May 17, 2002, now abandoned.

(60) Provisional application No. 60/291,649, filed on May 18, 2001.

(51) Int. Cl.
*C08K 3/00* (2006.01)
*C04B 14/00* (2006.01)

(52) U.S. Cl. ............ 524/2; 106/400; 106/412; 523/122; 524/5

(58) Field of Classification Search ...... 524/2; 106/400, 106/412; 428/688
See application file for complete search history.

(56) References Cited

U.S. PATENT DOCUMENTS

| | | |
|---|---|---|
| 2,549,516 A | 4/1951 | Parry |
| 3,642,482 A | 2/1972 | Williams, Jr. et al. |
| 3,929,692 A | 12/1975 | Offerman |
| 4,134,956 A | 1/1979 | Suzuki et al. |
| 4,581,147 A | 4/1986 | Branch, III |
| 4,946,505 A | 8/1990 | Jungk |
| 5,401,313 A | 3/1995 | Supplee et al. |
| 5,484,481 A | 1/1996 | Linde et al. |
| 5,853,476 A | 12/1998 | Will |
| 5,882,395 A | 3/1999 | Linde et al. |
| 6,241,787 B1 | 6/2001 | Nigam |
| 7,282,263 B2 | 10/2007 | Rasmusen et al. |

OTHER PUBLICATIONS

Technical Information—Styrene Maleimide Resins SMA X 1000I, X 2000I, X 3000I, X 4000I, Elft Atochem Brochure, 1998.
American Society for Testing and Materials; "Pigments for Integrally Colored Concrete"; C979-99; Jun. 10, 1999 (originally published as C-979-82).

*Primary Examiner* — Tae H Yoon
(74) *Attorney, Agent, or Firm* — McKenna Long & Aldridge LLP

(57) ABSTRACT

A cationic dispersion which includes at least one pigment, water, and at least one quaternary salt of a styrene maleimide imide resin in an amount effective to disperse the organic pigment. A method for preparing the cationic dispersion includes (i) mixing, at 500 to 10,000 rpm, at least one pigment; water; and either (a) at least one a quaternary salt of a styrene maleimide imide resin or (b) at least one styrene maleimide imide resin in combination with at least one weak acid, thereby forming a dispersion premix; (ii) milling the dispersion premix in a mixer filled with ceramic, metal or glass beads for a period of time sufficient to reduce pigment agglomerates to primary particles, thereby forming a nonstandardized dispersion; and (iii) standardizing the dispersion against a color standard by adding water. The resulting cationic dispersion exhibits good alkali resistance and lightfastness, and can be used to integrally color concrete and other building materials.

20 Claims, No Drawings

METHOD FOR COLORING BUILDING MATERIALS USING A CATIONIC PIGMENT DISPERSION

This is a continuation of application Ser. No. 10/478,385, filed Sep. 9, 2004, now abandoned, which is a national stage application of PCT/US02/15856, filed May 17, 2002, which claims priority to provisional application No. 60/291,649, filed May 18, 2001, all of which are incorporated herein by reference.

BACKGROUND OF INVENTION

1. Field of the Invention

This invention relates to a method for coloring building materials such as concrete, asphalt, plaster, mortar and cement mortar. More particularly, this invention relates to a method for coloring building materials using a cationic dispersion which contains at least one pigment, water, and at least one dispersing agent comprising a quaternary ammonium salt of a styrene maleimide imide copolymer.

2. Description of the Prior Art

It is desirable to color exposed concrete surfaces for both aesthetic and functional reasons. Colored concrete buildings do not present an environment as sterile and cold as white concrete. In addition, light colors can be used in sunny climates to help reduce glare while darker colors may be used to increase a building's heat storage capacity in cooler climates.

Coloring the exposed surface by painting or by coating the surface with some other decorative layer is known. U.S. Pat. Nos. 2,549,516; 3,929,692 and 4,134,956 disclose compositions for covering exposed concrete surfaces. However, painting or application of a coating layer is an additional step in construction which adds cost and complexity to a construction project. Moreover, an exterior painted surface may require repainting in a relatively short period of time.

Another approach is to add a color additive to the building material, thereby eliminating the extra step associated with painting the building surface. However, any color additive must be uniformly dispersed throughout the building material. This can be difficult given the low intensity mixing and short mixing times customary in the building materials industry. Moreover, the additive must not adversely affect the desirable properties of the building material, such as the strength or setting behavior of concrete or reduce the compressive strength or abrasion resistance of asphalt. See ASTM C 979-82 "Standard Specification for Pigments for Integrally Colored Concrete," which contains some of the industry association standards for coloring concrete.

Inorganic pigments are typically used as color additives for building materials and typically include iron oxides (natural and synthetic), chromium oxide, cobalt blue, and titanium dioxide. However, these inorganic pigments offer a limited range of colors and brightness.

Organic pigments have not been used to color building materials as it is believed they lack sufficient alkali resistance and lightfastness. In 1981 the American Society for Testing and Materials (ASTM) in a report entitled "Pigments for Integrally Colored Concrete," discussed the test results of various inorganic and organic pigments for lightfastness, alkali resistance, water wettability and curing stability. All of the organic pigments tested, including phthalocyanine green, failed to meet the lightfastness testing standards.

Dry pigment powders have been used to color concrete compositions because they are highly dispersible. However, these powders have poor processing properties, and typically cake together and form lumps upon storage. They also tend to form dust.

The use of free flowing granules or beads to overcome the processing problems and dust associated with dry pigment powders has been suggested. These granules may be produced by spray drying aqueous dispersions, as proposed by U.S. Pat. Nos. 4,946,505; 5,484,481; 5,853,476; and 5,882,395. However, the evaporation of the aqueous dispersion requires expensive equipment and significant energy expenditures which can make the use of such granules economically unattractive.

Another approach is to modify the particle's surface to improve its dispersibility in aqueous solution. U.S. Pat. No. 5,401,313 discloses a pigment particle whose surface is coated with an electric charge modifying agent and a dispersion promoting agent. The dispersion promoting agent is selected from stearates, acetates, alkylphenols, cellulosics, waxes, lignins, acrylics, epoxies, urethanes, ethylenes, styrenes, propylenes and polymers having functions groups of alcohols, glycols, aldehydes, amides and carboxylic acids, and is preferably sodium lignosulfonate for cementitious application systems. The surface-modified particle may be produced in powder, dispersion or granular form, with bead granules having a particle size of 25 to 250 microns being preferred.

Styrene maleimide imide resins and their quaternary salts are known. "Technical Information-Styrene Maleimide Resins SMA X 1000 I, X 2000 I, X 3000 I, X 4000 I," Elf Atochem Brochure (1998) suggests their use in paper sizing, as a cationic dispersing resin for pigments and particles in acidic and cationic formulations, as cationic polymeric surfactants, and as cationic modifiers for waterbased coatings, inks and varnishes. However, there is no disclosure or suggestion concerning the use of these resins to disperse pigments in building materials.

An object of the invention is to provide a method for coloring concrete using an aqueous pigment dispersion.

A feature of the method of the present invention is the use of a cationic dispersion containing at least one pigment, water, and at least one dispersing agent comprising a quaternary salt of a styrene maleimide imide resin to color building materials such as concrete.

An advantage of the present invention is the ability to color building materials such as concrete with bright organic pigments that do not suffer from poor alkali resistance and/or poor lightfastness.

Another advantage of the present invention is that it permits the ready removal of graffiti or other surface defacement from a concrete surface without impairing its surface appearance.

SUMMARY OF THE INVENTION

In one aspect, the present invention relates to a cationic dispersion suitable for coloring building materials, which includes
 (i) at least one pigment;
 (ii) at least one dispersing agent comprising a quaternary salt of a styrene maleimide imide resin; and
 (iii) water.

In another aspect, the present invention relates to a method for preparing a cationic dispersion suitable for coloring building materials, which includes
 (i) mixing, at 500 to 10,000 rpm, at least one pigment, water, and either (a) at least one a quaternary salt of a styrene maleimide imide resin or (b) at least one styrene maleimide imide resin in combination with at least one weak acid, thereby forming a dispersion premix;

(ii) milling the dispersion premix in a mixer filled with ceramic, metal or glass beads for a period of time sufficient to reduce pigment agglomerates to primary pigment particles, thereby forming a non-standardized dispersion;

(iii) adding water to the non-standardized dispersion until it matches a color standard and forms a cationic dispersion suitable for coloring building materials.

DETAILED DESCRIPTION OF THE PREFERRED EMBODIMENTS

Inorganic and organic pigments may be used in the cationic dispersion of the present invention. Suitable inorganic pigments include red oxide, yellow oxide, black iron oxide, cobalt blue, carbon black and bismuth vanadate (yellow 184).

Any organic pigment can be used if it exhibits good alkali resistance and light resistance, as determined according to ASTM C 979-82, herein incorporated in its entirety by reference. Suitable organic pigments may be chosen from azo pigments, such as azo lake, azo chelate and condensed azo pigments, and polycyclic pigments such as phthalocyanine pigments, perylene pigments, perinone pigments, anthraquinone pigments, quinacridone pigments, dioxazine pigments, thioindigo pigments, isoindolinone pigments and quinophethalone pigments. Preferred organic pigments are selected from phthalocyanine green, phthalocyanine blue, carbazole violet, toluidine red, perylene red, quinacridone red, quinacridone yellow, Dalamar yellow, Watchung red, and diketopyrrolopyrrole (DPP red).

The cationic dispersion of the present invention comprises at least one quaternary salt of a styrene maleimide imide resin. Styrene maleimide imide resins may be prepared by reacting a styrene maleimide resin with a primary diamine, such as dimethylaminopropylamine, to form a styrene maleimide imide having tertiary amine functional groups.

It is possible to prepare copolymers having a styrene/maleimide ratio ranging from 1/1 to 1/4 depending on the base resin employed in the imidization reaction. A particularly preferred styrene maleimide imide copolymer is prepared by reacting dimethylaminopropylamine with a styrene maleimide resin, commercially available from ATOFINA Chemicals, Inc., Philadelphia, Pa. Imidization can be performed using a non-reactive diluent, the desired amine, and the styrene maleimide resin. Typical reaction conditions are 150-180.quadrature.C for 30-40 minutes. The generalized reaction scheme is set forth below:

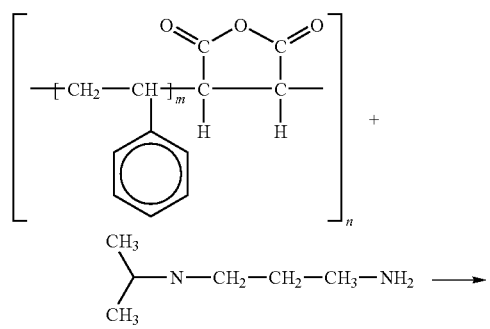

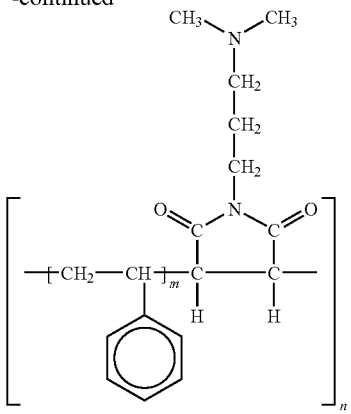

where n may be 1-3 and m is 6-8.

Further details on these styrene maleimide imide resins are found in "Technical Information-Styrene Maleimide Resins SMA X 1000 I, X 2000 I, X 3000 I, X 4000 I," Elf Atochem Brochure (1998), the disclosure of which is incorporated by reference herein in its entirety.

These styrene maleimide imide resins are insoluble in water. However, they may be converted to their corresponding quaternary salts, which are water soluble, by reaction with a weak acid. The weak acid may have an acid dissociation constant Ka of 1.times.10.sup.-2 to 1.times.10.sup.-7. Illustrative weak acids include acetic acid, citric acid, carbonic acid, hydrofluoric acid, oxalic acid and nitrous acid, with acetic acid being preferred. The pH of the cationic dispersion should be less than 7, preferably between 4 and 6.

The cationic dispersion of the present invention typically contains at least 10% by weight pigment. The dispersing agent is typically present in an amount of from 1-20%, preferably 3-8%, by weight. A slight excess of the weak acid may be present to ensure that the quaternary salt of the styrene maleimide imide remains solubilized. When acetic acid is employed, a ratio of about 1:5 acetic acid/resin is normally sufficient to ensure the solubility of the styrene maleimide imide resin quaternary salt.

Other additives may be present in any amount which does not detract from the cationic dispersion's effectiveness in integrally coloring building materials such as concrete. Suitable additives include viscosity control agents, surfactants and biocides. Suitable viscosity control agents include hydroxyalkyl celluloses, such as hydroxyethylcellulose, which are preferably added to the cationic dispersion to increase its viscosity to a range of from 800 to 10,000 centipoise, preferably 1,000 to 2,000 centipoise, at 25.quadrature.C. The amount of viscosity control agent will depend on the relative amounts of dispersing agent, organic pigment and water forming the dispersion, and may range from 0.05% to 2% by weight of the dispersion.

One or more surfactants may optionally be added to the dispersion to aid in its manufacture. For example, non-ionic surfactants having a hydrophobic/lipophobic balance (HLB) less than 11, also known as grind aids, may be added to the dispersion to decrease milling time by reducing the surface tension of the pigment/water interface. An illustrative grind aid is an acetylenic diol with an HLB of 3 which is commercially available under the trademark SURFYNOL 104 from Air Products, Inc., Allentown, Pa.

Surfactants may also be added to the cationic dispersion to reduce foaming during mixing of the dispersion. Suitable defoaming agents include mineral oils, silicone polymers and acetylenic diols. A defoaming agent comprising a mixture of dipropylene glycol and tetramethyl-6-dodecyne-5,8-diol, commercially available from Air Products, Inc. under the trademark DF110D, is preferred. A concentration of about 0.1 weight percent is normally sufficient to ensure the dispersion does not foam during mixing.

A biocide may also be added to the cationic dispersion. Suitable biocides include octhilinone, bromonitroalcohol, formaldehyde and formaldehyde-based derivatives. A concentration of about 0.1 weight percent is normally sufficient to ensure no harmful or objectionable bacteria colonize the dispersion.

The cationic dispersion of the present invention may be prepared by a three-stage process. In the first stage, the pigment, styrene maleimide imide quaternary salt, and water, together with any desired optional additives such as a surfactant and/or biocide, are mixed together in the desired amounts to form a dispersion premix. Conventional high speed mixing equipment may be used without modification. A mixing speed of from 500 to 10,000 rpm for a time period of from 1 minute to 2 hours, preferably 10-25 minutes, may be used depending on the size of the batch.

One of ordinary skill in the art will readily understand that the dispersion of the present invention can also be prepared using a styrene maleimide resin rather than its corresponding quaternary salt, if a weak acid is also added to solubilize the styrene maleimide imide resin per se.

In the second stage, the dispersion premix is media milled, typically using ceramic, metal or glass beads, to reduce pigment agglomerates to primary particles, thereby forming a non-standardized dispersion. Media milling can be performed using conventional milling equipment without modification.

In the third and final stage, water is added to the non-standardized dispersion until the color of the dispersion matches a color standard. Generally from 5 to 10% by weight water is required to standardize the dispersion.

The cationic dispersion of the present invention may be used to integrally color building materials such as cement, asphalts, plaster, mortar and cement mortar at the construction site. More particularly, the cationic dispersion may be added to the building material as it is being formulated. Thus, for example, from 0.1% to 10% by weight, preferably 2-3% by weight, of the cationic dispersion may be added to a concrete mixer containing Portland cement, sand/gravel aggregate and water, and homogenized for approximately 15-30 minutes. The resulting mixture may be poured into a prepared mold and allowed to harden to form integrally colored concrete.

The styrene maleimide imide quaternary salt is only soluble in an acidic solution, and becomes insoluble in an alkaline environment. Without intending to be bound by theory, the inventors currently believe that the cationic styrene maleimide imide quaternary salt coats the pigment particles, thereby allowing them to disperse in water. When the dispersion is mixed with concrete, the coated pigment particles are rapidly dispersed throughout the wet concrete, which has a high pH, typically above 10. The styrene maleimide imide quaternary salt is converted into its corresponding styrene maleimide imide resin by deprotonation due to the alkalinity of the cement, thus becoming water insoluble and immobilising the coated pigment particles within the concrete matrix.

EXAMPLES

The following examples illustrate preferred embodiments of the invention, and are not intended to limit the scope of the invention in any manner whatsoever.

Example 1

Formulation of a Cationic Dispersion Containing Blue Pigment

A high speed mixer was used to mix acetic acid, phthalocyanine blue pigment, styrene maleimide imide resin (SMA X 2000 I, commercially available from ATOFINA Chemicals, Inc., Philadelphia, Pa.), a defoaming agent comprising a mixture of dipropylene glycol and tetramethyl-6-dodecyne-5,8-diol, commercially available from Air Products, Inc. under the trademark DF110D, a biocide comprising octhilinone, commercially available from Thomson Research Associates, Toronto, Canada, under the trademark ULTAFRESH DM-25, and water to form a dispersion premix, which was then media milled (Eiger mixer) to disperse and incorporate the pigment into the system. The cationic dispersion had a total solids percentage of 48.7%. The weight percentage composition of this cationic dispersion is set forth below in Table 1:

TABLE 1

| MATERIALS | WEIGHT PERCENTAGES |
|---|---|
| Styrene Maleimide Imide | 5.50 |
| Pigment (Phthalo Blue) | 43.00 |
| Weak Acid (Acetic Acid) | 1.00 |
| Defoamer | 0.10 |
| Biocide | 0.10 |
| Water | 50.30 |
| TOTAL | 100% |

Example 2

Formulation of a Cationic Dispersion Containing Yellow Pigment

A second cationic dispersion was formulated using the general procedures of Example 1. The weight percentage composition of the resulting cationic dispersion is set forth below in Table 2:

TABLE 2

| MATERIALS | WEIGHT PERCENTAGES |
|---|---|
| Styrene Maleimide Imide | 5.10 |
| Pigment (Yellow 97) | 40.00 |
| Weak Acid (Acetic Acid) | 1.00 |
| Defoamer | 0.10 |
| Biocide | 0.10 |
| Water | 53.70 |
| TOTAL | 100% |

Example 3

Integrally Coloring Concrete

The cationic dispersions of Examples 1 and 2 were each individually used to integrally color concrete by mixing an appropriate amount (1%) of the dispersion with concrete in a laboratory mixer for approximately 15 minutes. Each of the cationic dispersions readily became part of the concrete matrix.

What is claimed is:

1. A colored building material, comprising a cationic dispersion dispersed in a building material selected from the group consisting of cement, asphalt, and mortar in which the cationic dispersion comprises (i) at least one pigment; (ii) at least one dispersing agent which is (a) at least one acid salt of a styrene maleimide imide resin or (b) a combination of at least one styrene maleimide imide resin and at least one weak acid; and (iii) water.

2. The colored building material of claim 1, wherein said mortar is cement mortar.

3. The colored building material of claim 1, wherein said pigment is at least one pigment selected from the group consisting of phthalocyanine green, phthalocyanine blue, carbazole violet, toluidine red, Dalamar yellow, Watchung red, diketopyrrolopyrrole, quinacridone red, quinacridone yellow, quinacridone violet, arylide yellow, red oxide, yellow oxide, black iron oxide, cobalt blue, carbon black and bismuth vanadate.

4. The colored building material of claim 3, wherein the dispersion further comprises at least one member of the group consisting of a surfactant, a biocide and a viscosity control agent.

5. The colored building material of claim 4, wherein said dispersing agent is 1-20% by weight of the dispersion.

6. The colored building material of claim 1, wherein said pigment is at least one organic pigment selected from the group consisting of phthalocyanine green, phthalocyanine blue, carbazole violet, toluidine red, Dalamar yellow, Watchung red and diketopyrrolopyrrole.

7. The colored building material of claim 1, wherein said pigment is a phthalocyanine.

8. The colored building material of claim 1, wherein said pigment is at least one inorganic pigment selected from the group consisting of red oxide, yellow oxide, black iron oxide, cobalt blue, carbon black and bismuth vanadate.

9. The colored building material of claim 1, wherein the cationic dispersion further comprising at least one member of the group consisting of a surfactant, a biocide and a viscosity control agent.

10. The colored building material of claim 1, wherein, wherein said pigment comprises primary particles.

11. The colored building material of claim 10, wherein said dispersing agent is 1-20% of the cationic dispersion.

12. The colored building material of claim 11, wherein the cationic dispersion further comprises at least one member of the group consisting of a surfactant, a biocide and a viscosity control agent.

13. A process for preparing a colored building material, comprising: (i) mixing, at 500 to 10,000 rpm, at least one pigment, water, and either (a) at least one acid salt of a styrene maleimide imide resin or (b) a combination of at least one styrene maleimide imide resin and at least one weak acid, thereby forming a dispersion premix; (ii) milling the dispersion premix in a mixer filled with a milling media for a period of time sufficient to reduce pigment agglomerates to primary particles, thereby forming a non-standardized dispersion; (iii) adding water to the non-standardized dispersion until it matches a color standard and forms a cationic dispersion suitable for coloring building materials; and (iv) dispersing said cationic dispersion suitable for coloring building materials in a building material selected from the group consisting of cement, asphalt, and mortar.

14. The process of claim 13, wherein said pigment and water are mixed with at least one acid salt of a styrene maleimide imide resin.

15. The process of claim 13, wherein said pigment and said water are mixed with a combination of at least one styrene maleimide imide resin and at least one weak acid.

16. The process of claim 15, wherein said weak acid is at least one member selected from the group consisting of acetic acid, citric acid, carbonic acid, hydrofluoric acid, oxalic acid and nitrous acid.

17. The process of claim 13, wherein said pigment is at least one pigment selected from the group consisting of phthalocyanine green, phthalocyanine blue, carbazole violet, toluidine red, Dalamar yellow, Watchung red, diketopyrrolopyrrole, quinacridone red, quinacridone yellow, quinacridone violet, arylide yellow, red oxide, yellow oxide, black iron oxide, cobalt blue, carbon black and bismuth vanadate.

18. The process of claim 17, wherein said pigment is an organic pigment.

19. The process of claim 18, wherein said organic pigment is a phthalocyanine.

20. The process of claim 17, wherein said pigment is an inorganic pigment.

* * * * *